United States Patent
Huseby

(10) Patent No.: US 10,173,289 B2
(45) Date of Patent: Jan. 8, 2019

(54) ROLLOUT WHEEL

(71) Applicant: Darren Huseby, Grand Junction, CO (US)

(72) Inventor: Darren Huseby, Grand Junction, CO (US)

(*) Notice: Subject to any disclaimer, the term of this patent is extended or adjusted under 35 U.S.C. 154(b) by 0 days.

(21) Appl. No.: 15/201,840

(22) Filed: Jul. 5, 2016

(65) Prior Publication Data

US 2018/0009067 A1 Jan. 11, 2018

(51) Int. Cl.
*B23K 37/06* (2006.01)
*B23K 37/053* (2006.01)
*B23K 101/06* (2006.01)

(52) U.S. Cl.
CPC ...... *B23K 37/0538* (2013.01); *B23K 37/0533* (2013.01); *B23K 2101/06* (2018.08)

(58) Field of Classification Search
CPC ............ B23K 2201/06; B23K 2201/10; B23K 31/027; B23K 37/0538; B23K 37/053
USPC ........ 228/44.3, 44.5, 47.1–49.2; 219/121.58, 219/158
See application file for complete search history.

(56) References Cited

U.S. PATENT DOCUMENTS

| | | | |
|---|---|---|---|
| 1,946,839 A * | 2/1934 | Cole | B23Q 5/28 475/2 |
| 1,961,605 A * | 6/1934 | Drissner | B23Q 3/12 279/158 |
| 2,501,985 A * | 3/1950 | Benjamin | B65H 16/06 242/559 |
| 4,271,346 A * | 6/1981 | Hardy | B23K 9/046 219/125.11 |
| 4,733,814 A * | 3/1988 | Penman | B23K 20/12 228/114.5 |
| 9,802,277 B2 * | 10/2017 | Beatty | B23K 37/0452 |
| 2015/0129643 A1 * | 5/2015 | Gaudreault | B23K 37/0538 228/49.1 |

FOREIGN PATENT DOCUMENTS

WO    WO-9738816 A2 * 10/1997 ........... B23K 26/103

* cited by examiner

*Primary Examiner* — Erin B Saad
*Assistant Examiner* — Carlos J Gamino
(74) *Attorney, Agent, or Firm* — Maier & Maier, PLLC

(57) ABSTRACT

A rollout wheel apparatus for performing welding. The rollout wheel apparatus may comprise a mount; a support section; a spindle extending from the support section; a substantially circular hub disposed on the spindle and free to rotate about the spindle, the hub having a narrow portion facing the support section and a wide portion facing the chuck, the hub further including a brake pad disposed about the circumference of the narrow portion; a brake, the brake being affixed to the support section and having a cantilever design, wherein the brake is cantilevered from the support section to a point located radially outwards from the brake pad of the substantially circular hub; and a chuck, the chuck comprising a chuck locking mechanism and a plurality of jaws.

14 Claims, 4 Drawing Sheets

ROLLOUT WHEEL

BACKGROUND

Welding pipe can be one of the most difficult tasks in welding, to the point where skilled pipe welders are some of the most highly demanded and highly paid welders in the profession. One of the main reasons why welding a pipe fitting is so difficult is because it demands very precise welds. A given weld will typically have to create a perfect seal in the pipe fitting for it to be useful in a pipe; otherwise, it may experience leaks or even cracking. Furthermore, after a pipe fitting has been welded and the pipe has been put in use, the pipe, and the weld, will generally have to deal with vibrations, variance in temperature and pressure, and other conditions that can cause cracking in a bad weld. As such, it is important to be able to achieve a careful, consistent weld.

However, due to the geometry of pipes, this is often difficult to achieve. In order to seal a pipe, a weld must be placed around the entire circumference of the pipe, which can generally be very difficult to do without shifting or moving the pipe in such a way that the existing weld is disrupted. Further, because of their geometry (long, thin, cylindrical, and without many mated surfaces that can be clamped together) many pipes can be difficult to clamp in place or otherwise secure. Some pipes may also have complex geometries with various bends and turns, and these may make it difficult to get the pipes in the right position to be welded. Many pipes may also be composed of materials that are considered to be difficult to weld, adding to the complexity of welding a given pipe fitting and making it more likely that the welder will make a mistake.

A device for assisting in the creation of pipe welds may be envisioned.

SUMMARY

According to an exemplary embodiment, a rollout wheel apparatus for performing welding may be described. The rollout wheel apparatus may include a mount; a support section; a spindle extending from the support section; a substantially circular hub disposed on the spindle and free to rotate about the spindle, the hub having a narrow portion facing the support section and a wide portion facing the chuck, the hub further including a brake pad disposed about the circumference of the narrow portion; a brake, the brake being affixed to the support section and having a cantilever design, wherein the brake is cantilevered from the support section to a point located radially outwards from the brake pad of the substantially circular hub; and a chuck, the chuck including a chuck locking mechanism and a number of jaws.

According to another exemplary embodiment, a method of using a rollout wheel apparatus may be described. The method may include: inserting a part into the chuck; securing the chuck jaws with the chuck locking mechanism; rotating the hub, using the hand wheel, to a desired initial rotational position; welding the part held by the chuck; and rotating the hub in order to rotate the part held by the chuck while simultaneously continuing to weld the part held by the chuck.

BRIEF DESCRIPTION OF THE FIGURES

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

An exemplary embodiment of a device for fitting and welding pipe fittings may be provided. Such a device may be called a "rollout wheel" or a "chuck spinner." The rollout wheel may use a lathe chuck mounted to a plate and ring; this chuck may rotate, for example on a trailer axle bearing or other bearing. The rollout wheel may have adjustable components; for example, the tilt of the chuck or the brake for the hub may be adjustable. Adjustment of the rollout wheel may be done through hand wheels placed on the device, or may be done through another method, as desired.

Figure 1:
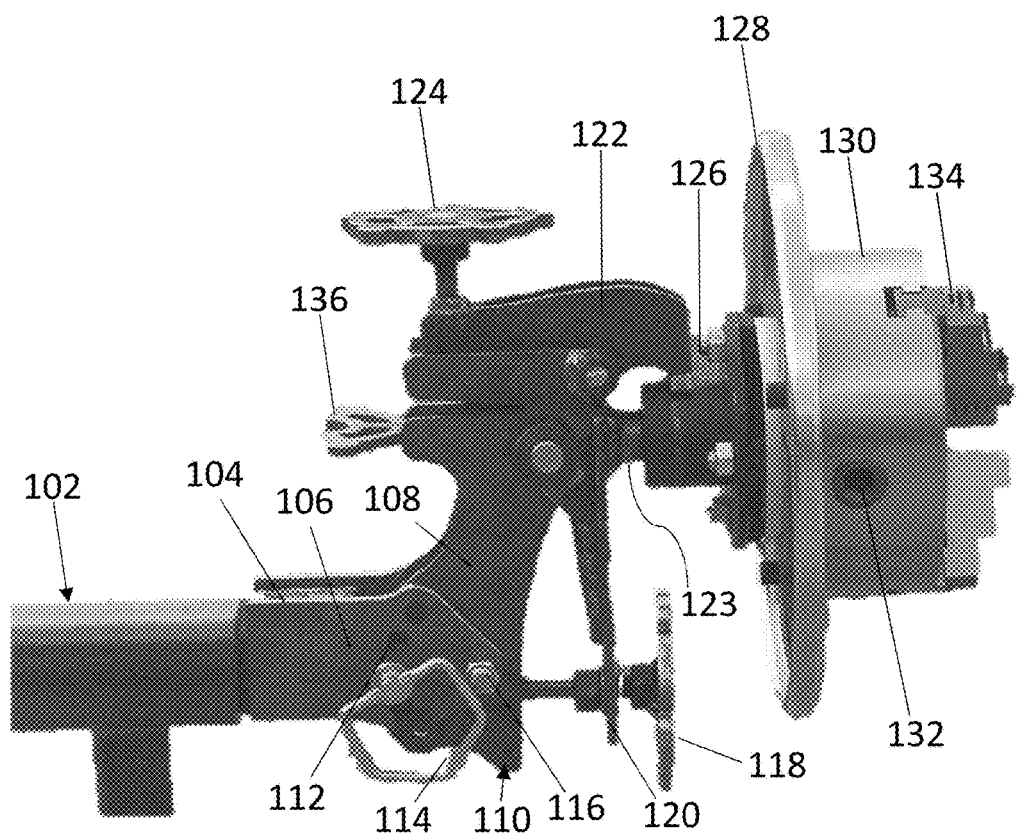
FIG. 1 depicts an exemplary embodiment of a rollout wheel.

FIG. 1 shows an exemplary embodiment of a rollout wheel 100. Rollout wheel 100 may include a stand 102, a mount 104, a mounting plate 106 or multiplicity of mounting plates, a support section 108, a tilt adjustment mechanism 110 including a plurality of pinholes 112, a locking pin 114, and a pivot 116, and further including a tilt adjustment hand wheel 118 and a tilt adjustment lever 120 linked to the tilt adjustment hand wheel 118. Rollout wheel 100 may also include a brake 122 including a brake adjustment hand wheel 124, spindle 123 a hub 126 having a narrow portion 125 and a wide portion 127, a hub hand wheel 128, and a chuck 130 including a chuck locking mechanism 132 and multiple jaws 134. Rollout wheel 100 may also include a stinger hook 136.

According to an exemplary embodiment, the tilt adjustment mechanism 110 may allow for adjustment of the tilt of the chuck 130 via both the plurality of pinholes 112 and via the tilt adjustment hand wheel 118. According to one exemplary embodiment, there may be a hole going through the support section 108, and a plurality of pinholes 112 spaced in an arc several degrees apart located on the mounting plate 106. The hole going through the support section 108 and each of the plurality of pinholes 112 may be substantially the same size and may be aligned with each other, such that when so aligned, the locking pin 114 may be placed through one of the plurality of pinholes 112 and through the support section 108, preventing the support section 108 from tilting up or down. Locking pin 114 may extend to or through another mounting plate 106 on the other side of the support section 108; this second mounting plate 106 may be a mirror of the first or may be different, as desired. Additional mounting plates 106, such as a central mounting plate that fits within a slot in the support section, may also be included. According to an exemplary embodiment, adjustment of the tilt of the chuck 130 using the plurality of pinholes 112 may include removing the locking pin 114 from the tilt adjustment mechanism 110 and pivoting the support section 108 up or down so that a new hole in the plurality of pinholes 112 is aligned with the hole in the support section 108. The locking pin 114 may then be reinserted through the new hole in the plurality of pinholes 112 and through the support section 108 in order to secure the support section 108 in place.

According to an exemplary embodiment, the tilt adjustment mechanism 110 may have a substantial range through which it can be adjusted. For example, according to one exemplary embodiment, the tilt adjustment mechanism 110 may be adjustable from a vertical position to a horizontal position, or may be adjustable from one vertical or horizontal position to another vertical or horizontal position. Other ranges, including both smaller and larger ranges, may also be envisioned. According to an exemplary embodiment, the pivoting of the tilt adjustment mechanism 110 and of the support section 108 may be constrained by a pivot 116; however, this pivot may be removable in order to permit the repositioning of the support section 108. For example, according to an exemplary embodiment, the support section 108 may be flipped around and installed backwards to facilitate a greater range of motion; according to an exemplary embodiment, this may allow the rollout wheel 100 to hold a piece of pipe horizontally or substantially horizontally rather than vertically or substantially vertically. This may also be done in order to use a smaller mounting plate 106 or a tilt adjustment mechanism 110 with a smaller or finer range of adjustment; for example, in order to have a potential range of tilts of between 0 and 90 degrees, the tilt adjustment mechanism 110 may permit tilts of between 0 and 45 degrees, and may also be removable so that it can be placed at the 90 degree mark and adjusted back. Other embodiments may also be envisioned.

According to an exemplary embodiment, the tilt adjustment hand wheel 118 may be linked to the tilt adjustment lever 120 via a thrust bearing. Tilt adjustment hand wheel 118 may be used for fine adjustment of the tilt of the chuck 130; turning the tilt adjustment hand wheel 118 one way may slightly increase the tilt of the chuck 130, while turning the tilt adjustment hand wheel 118 in the other direction may slightly decrease the tilt of the chuck 130. The range of the tilt adjustment hand wheel 118 may be the same range as or a greater range than the spacing between holes in the plurality of pinholes 112; this may allow the chuck 130 to be adjusted to any desired angle by using a combination of the tilt adjustment hand wheel 118 and the plurality of pinholes 112. According to such an exemplary embodiment, in order to make an adjustment of the chuck 130 angle, a user may first make a rough adjustment by aligning the locking pin 114 with the right pinhole in the plurality of pinholes 112. Then, a user may make a finer adjustment of the chuck 130 angle by adjusting the tilt adjustment hand wheel 118 until the chuck 130 is in the desired position. If necessary, the user may also be able to take the support section 108 off of the pivot 116, for example by unscrewing the pivot, and then may be able to replace the support section 108 in another position or in another orientation. Other tilt adjustment features may be present, as desired.

According to an exemplary embodiment, the chuck 130 may be a standard lathe chuck or other chuck, as desired. For example, according to an exemplary embodiment, an 8-inch 3-jaw chuck may be used. Alternatively, a faceplate may be used instead of a chuck 130, as desired. Chuck 130 may be connected to a hub 126, such as a trailer hub, which may in turn be mounted on a spindle; any such hub may be used, so long as the hub 126 fits the chuck 130 or faceplate, whichever is used. For example, according to one exemplary embodiment, the hub 126 may be a 4-inch on 4-inch trailer hub having tapered roller bearings. According to an exemplary embodiment, hub 126 may be flipped around backwards as compared to how it would normally be mounted on a trailer, with the longer side of the hub 126 facing inward and the shorter side of the hub 126 facing outward. This may ensure that the chuck jaws 134 can close cleanly without interference from the hub 126. According to an exemplary embodiment, one or more spacers may further be used to space the end of the hub from the jaws of the lathe chuck; for example, spacer washers may be used in order to keep the chuck 130 from hitting the bolts on the hub.

According to an exemplary embodiment, the rollout wheel 100 may further include a brake 122 and a brake adjustment hand wheel 124. According to one exemplary embodiment, the brake 122 may be deployed manually, using the brake adjustment hand wheel 124; a user may turn the wheel in one direction or the other in order to extend or retract the brake, as desired. According to an exemplary embodiment of the brake 122, the brake 122 may be cantilevered from a top portion of the rollout wheel apparatus, such as a top portion of the support section 108; this may help to create more leverage on the brake pad when the brake 122 contacts the hub 126. Brake 122 may be adjustable from side to side; this may ensure that the brake 122 can hit the hub 126 dead center and will not make the hub 126 move when tightened. Side-to-side adjustment of the brake 122 may take place using adjustable nuts positioned on either side of the brake, allowing for lateral movement, as desired. Further, the brake adjustment hand wheel 124 if it is not used to manually extend or retract the brake. Alternatively, the brake 122 may be adjusted from side to side using another method; for example, the brake 122 may rest between two or more guides, which may be moved in order to adjust where the brake 122 will contact the hub 126, as desired. Brake adjustment hand wheel 124 may also be positioned as a hand rest, if desired.

A user may generally operate the rollout wheel 100 by first securing the brake 122 to lock the hub 126 in place, and then placing a pipe or other part into the chuck 130, and securing the jaws 134 with the locking mechanism 132. The user may then adjust the tilt of the hub 126 using the tilt adjustment mechanism 110 until the chuck 130 is in a desirable position. The user may also loosen the brake 122 and then rotate the hub 126 using the hub hand wheel 128 to a desirable starting position. Once the user has rotated the hub 126, and by extension the chuck 130, to a desirable rotational position, they may then rotate the hub 126 in order to work on a pipe or other part held in the chuck 130. Alternatively, they can reapply the brake 122 or leave it secured, so that they can work on the pipe or other part that is held in the chuck 130 with the part remaining in a fixed position.

According to an exemplary embodiment, the rollout wheel 100 may also include a stinger hook 136 or similar feature. Stinger hook 136 may be used to hold a welding stinger, other electrode holder, or other welding implement, as desired. Stinger hook 136 may be constructed differently depending on the welding implement to be accommodated; for example, according to one exemplary embodiment, the stinger hook 136 may be constructed from material that is electrically nonconductive or substantially electrically nonconductive, in order to minimize the risk of electric shock to the users of the rollout wheel 100. An alternative exemplary embodiment of the stinger hook 136 may be thermally nonconductive or substantially thermally nonconductive, as desired. According to an exemplary embodiment, another feature may serve as the stinger hook 136, in addition to serving in its other role; for example, the brake adjustment hand wheel 124 may double as a stinger hook, if desired.

According to an exemplary embodiment, the design of the rollout wheel 100 may be such that it can be constructed primarily or entirely from inexpensive CNC laser-cut parts. This may ensure that it can be manufactured economically in small quantities as well as large ones, as no matter how small a particular order is it can always be cut using a CNC mill efficiently, alternatively. According to one exemplary embodiment, the rollout wheel 100 may be primarily constructed out of steel, specifically steel plate. The parts of the rollout wheel 100 may be laser cut with tabs and stops; according to an exemplary embodiment, these parts may be self-jigging, and may go together like a puzzle. Other materials may be used in the construction of the rollout wheel 100; for example, some parts may be constructed from bronze, as desired.

According to an exemplary embodiment, the rollout wheel 100 may be mated to any compatible stand 102 using a mount 104. Mount 104 may attach to stand 102, for example, by the use of a bolt or plurality of bolts, or screw or plurality of screws. According to other embodiments, the mount 104 may be welded to the stand, as desired.

Figure 2:
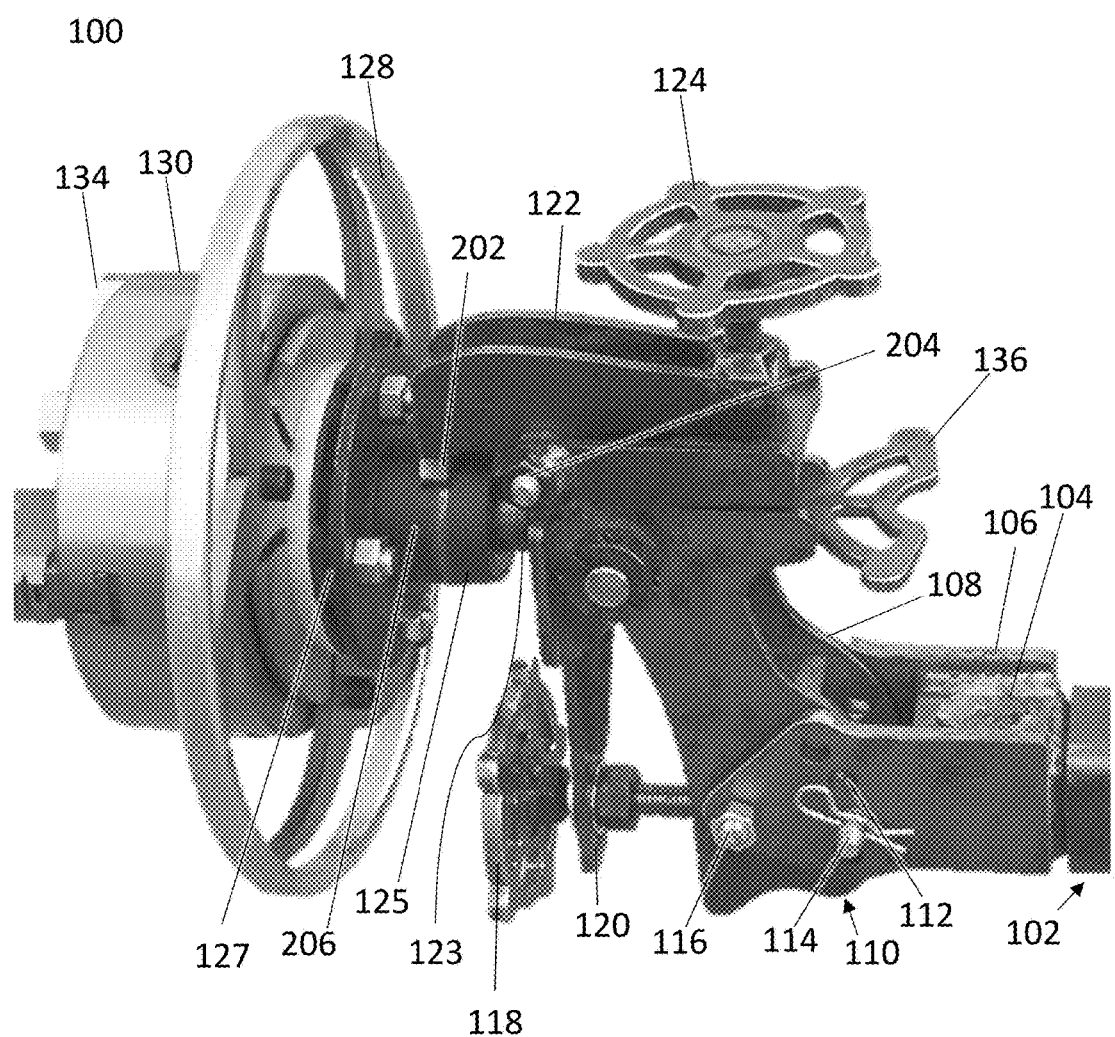
FIG. 2 depicts an exemplary embodiment of a rollout wheel, as seen from the opposite side.

Turning now to exemplary FIG. 2, FIG. 2 depicts an exemplary embodiment of a rollout wheel 100 as seen from the opposite side. Several additional features of the brake 122 not clearly shown in FIG. 1 can be seen in FIG. 2. The brake 122 may include, in addition to a brake adjustment hand wheel 124, a brake contact surface 202 and at least one brake guide 204. The hub 126 may include a brake pad 206. [CM1]When the brake adjustment hand wheel 124 is tightened or loosened, the brake 122 may raise or lower. When the brake adjustment hand wheel 124 is tightened, the brake 122 may lower such that the brake contact surface 202 comes into contact with the brake pad 206. When enough pressure is applied to the brake 122, the brake 122 may prevent the hub 126 from rotating from side to side and hold it essentially in place. Then the brake adjustment hand wheel 124 is loosened, the brake may come away from the brake pad 206 and allow the hub 126 to spin freely once more. The brake guide or brake guides 204 may ensure that the brake 122 is constrained to only contact the hub 126 in the correct area; the brake guides 204 may be adjustable in width and adjustable from side to side to ensure that the brake guides 204 can be tailored to a particular brake 122 or hub 126. Alternatively, a brake guide 204 of fixed width can be used, if desired.

According to an exemplary embodiment of the rollout wheel 100, it may be motorized instead of manually-driven, if desired. According to such an embodiment, a motor may be used to automatically drive the hub 126, which may remove the need for a user to turn the hub 126 manually when welding. Such a motor may be linked to a user-controlled kill switch, such as a foot pedal, as desired.

Figure 3:
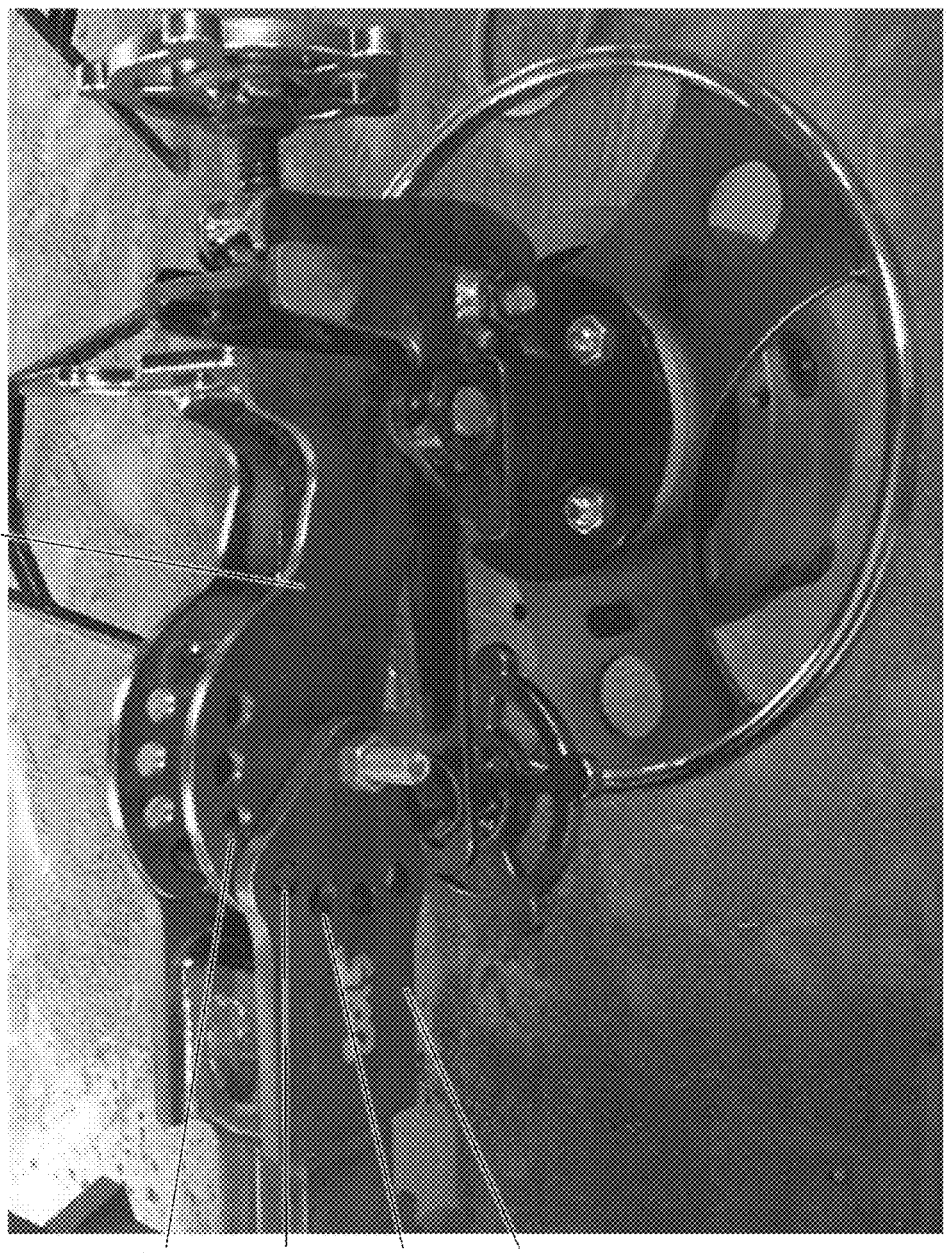
FIG. 3 depicts an exemplary embodiment of a rollout wheel having a particular angular configuration.

Turning now to exemplary FIG. 3, FIG. 3 depicts an exemplary embodiment of a rollout wheel 300 as shown in an alternate configuration. According to such an embodiment, both the support section 108 and the mounting plates 106 may have a plurality of pinholes; the pinholes in the support section 108 may be indicated as 302, while the pinholes in the mounting plates 106 may be indicated as 112. Having a plurality of pinholes in both the support section 108 and the mounting plates 106 may allow the support section 108 and the mounting plates 106 to be aligned at a variety of angles; for example, according to the exemplary embodiment displayed in FIG. 3, by aligning the lowermost support section pinhole 302 and the uppermost mounting plate pinhole 112, and inserting a locking pin 114 between them, the rollout wheel 300 may be held horizontal.

Figure 4:
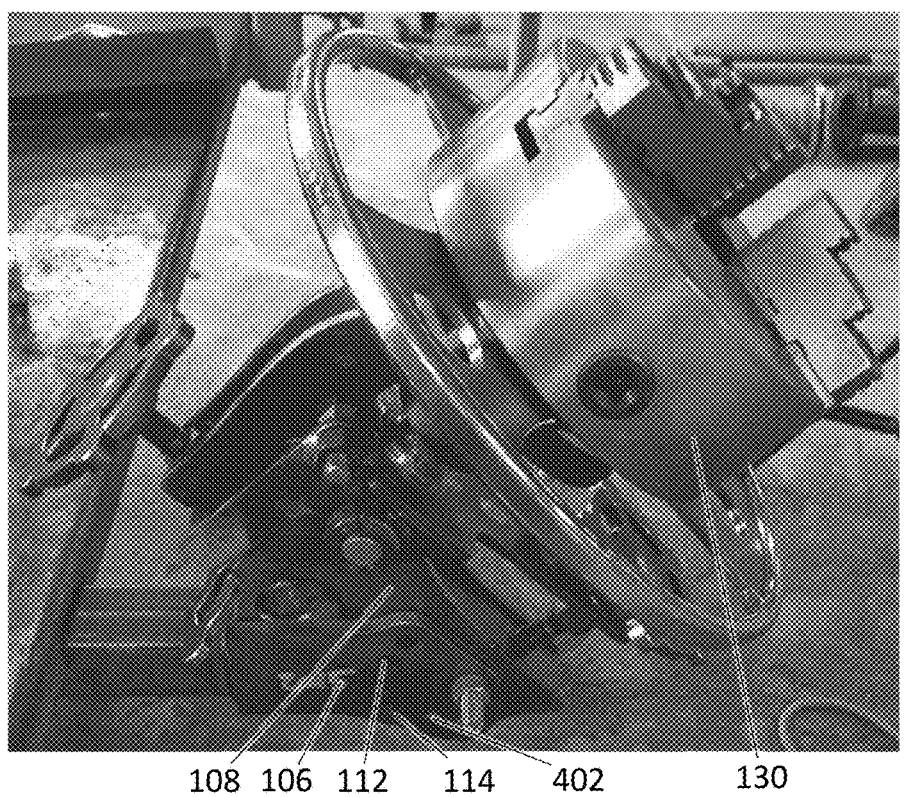
FIG. 4 depicts an exemplary embodiment of a rollout wheel having a particular angular configuration.

Turning now to exemplary FIG. 4, FIG. 4 depicts an exemplary embodiment of a rollout wheel 400 as shown in an alternate configuration. According to such an embodiment, and as in FIG. 3, both the support section 108 and the mounting plates 106 may have a plurality of pinholes; the pinholes in the support section may be indicated as 402, while the pinholes in the mounting plates may be indicated as 112. These may likewise be aligned at a variety of angles in order to allow the chuck 130 to be adjusted to a desired angle. For example, according to the exemplary embodiment displayed in FIG. 4, by aligning the support section pinhole 402 that is second from the top and the lowermost mounting plate pinhole 112 and inserting a locking pin 114 between them, the rollout wheel 400 may be held at an angle facing upwards. Different angles that may be formed by the mounting plates 106 and the support section 108 may be envisioned, as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A rollout wheel apparatus, comprising:
   a mount;
   a support section;
   a spindle extending from the support section;
   a substantially circular hub disposed on the spindle and free to rotate about the spindle, the hub having a narrow portion facing the support section and a wide portion facing the chuck, the hub further including a brake pad disposed about a circumference of the narrow portion facing the support section;
   a brake, the brake being affixed to the support section and having a cantilever design, wherein the brake is cantilevered from the support section to a point located radially outwards from the brake pad of the substantially circular hub; and
   a chuck, the chuck comprising a chuck locking mechanism and a plurality of jaws.

2. The apparatus of claim 1, wherein:
   the mount comprises a plurality of mounting plates, each mounting plate having a plurality of pinholes of uniform size extending through the mounting plate and arranged in an arc;

the support section is coupled to the mount by a pivot and by a removable locking pin; and the removal of said locking pin allows the support section to rotate about the pivot.

3. The apparatus of claim 2, wherein the support section is removably coupled to the mount, and wherein the pivot is removable.

4. The apparatus of claim 2, wherein the support section further includes a plurality of pinholes extending through the support section, the plurality of pinholes of the support section being arranged in substantially the same arc as the pinholes of each of the mounting plates, and wherein each of the plurality of pinholes of the support section is of sufficient size to accommodate the removable locking pin.

5. The apparatus of claim 1, further comprising a tilt adjustment hand wheel operationally linked to a tilt adjustment lever, wherein the tilt adjustment hand wheel is configured to increase or decrease an angle at which the chuck is disposed.

6. The apparatus of claim 1, wherein the brake further comprises a brake adjustment hand wheel, and wherein the brake adjustment hand wheel governs the tightness of the brake.

7. The apparatus of claim 1, wherein the brake further comprises a plurality of guides disposed on two or more sides of the brake.

8. The apparatus of claim 6, wherein the plurality of guides are adjustable.

9. The apparatus of claim 1, wherein the apparatus further includes a stinger hook configured to hold a welding stinger.

10. The apparatus of claim 1, wherein the mount is affixed to a stand.

11. The apparatus of claim 1, wherein the mount is removably coupled to a stand.

12. The apparatus of claim 1, wherein the apparatus is formed from steel plate.

13. The apparatus of claim 1, wherein the hub is operationally connected to a hub hand wheel, and wherein rotary motion of the hub hand wheel causes simultaneous rotary motion in the hub.

14. A rollout wheel apparatus, comprising:
a stand;
a mount, the mount being coupled to the stand, the mount further comprising a plurality of mounting plates, each mounting plate having a plurality of pinholes of uniform size extending through the mounting plate and arranged in an arc;
a support section, the support section including at least one pinhole extending through the support section, and wherein the support section is coupled to the mount by a pivot and by a locking pin extending through the at least one pinhole extending through the support section and through one of the plurality of pinholes in at least one of the mounting plates;
a tilt adjustment hand wheel operationally linked to a tilt adjustment lever, wherein the tilt adjustment hand wheel is configured to increase or decrease an angle at which the chuck is disposed;
a spindle extending from the support section;
a substantially circular hub disposed on the spindle and free to rotate about the spindle, the hub having a narrow portion facing the support section and a wide portion facing the chuck, the hub further including a brake pad disposed about the circumference of the narrow portion facing the support section;
a hub hand wheel operationally connected to the hub;
a brake, the brake being affixed to the support section and having a cantilever design, wherein the brake is cantilevered from the support section to a point located radially outwards from the brake pad of the substantially circular hub; and
a chuck, the chuck comprising a chuck locking mechanism and a plurality of jaws.

* * * * *